US006124802A

United States Patent [19]

Ozaki

[11] Patent Number: 6,124,802

[45] Date of Patent: Sep. 26, 2000

[54] SELECTIVELY CALLED RADIO RECEIVER AND CONTROLLING METHOD THEREOF

[75] Inventor: Ichiro Ozaki, Shizuoka, Japan

[73] Assignee: NEC Corporation, Tokyo, Japan

[21] Appl. No.: 08/992,533

[22] Filed: Dec. 17, 1997

[30] Foreign Application Priority Data

Dec. 25, 1996 [JP] Japan .................................... 8-346148

[51] Int. Cl.[7] ..................................................... G05B 23/02

[52] U.S. Cl. ................................ 340/825.44; 365/230.01; 714/53

[58] Field of Search ......................... 340/825.16, 825.06, 340/825.44, 172.5, 825.07; 365/201, 230.01; 714/53, 752, 774, 23

[56] References Cited

U.S. PATENT DOCUMENTS

| | | | |
|---|---|---|---|
| 3,742,458 | 6/1973 | Inoue et al. | 340/172.5 |
| 4,649,538 | 3/1987 | DeLuca et al. | 371/25 |
| 5,726,641 | 3/1998 | Ide | 340/825.22 |

FOREIGN PATENT DOCUMENTS

| | | |
|---|---|---|
| 59-70033 | 4/1984 | Japan . |
| 6-231007 | 8/1994 | Japan . |

OTHER PUBLICATIONS

Japanese Office Action, dated Dec. 8, 1998, with English language translation of Japanese Examiner's comments.

*Primary Examiner*—Michael Horabik
*Assistant Examiner*—Matsuichiro Shimizu
*Attorney, Agent, or Firm*—McGuireWoods, LLP

[57] ABSTRACT

A selectively called radio receiver is arranged by a receiving unit for receiving a radio selection signal, an operation unit for accepting an operation, a storage unit for storing a control program, and a processing unit for processing the reception information derived from the receiving unit and the operation information outputted from the operation unit in accordance with the control program stored in the storage unit. This selectively called radio receiver is further arranged by a notifying unit for producing notification information based on the processing information outputted from the processing unit, and a monitoring unit for monitoring an access condition by the processing unit to the storage unit. Even when the processing unit is erroneously operated, increasing of power consumption can be suppressed, and the reliability of this selectively called radio receiver can be improved.

18 Claims, 6 Drawing Sheets

SELECTIVELY CALLED RADIO RECEIVER AND CONTROLLING METHOD THEREOF

BACKGROUND OF THE INVENTION

1. Field of the Invention

The present invention relates to a selectively called radio receiver, and a method for controlling this selectively called radio receiver, and more specifically, is directed to a technique for monitoring error operations of a control unit employed in the selectively called radio receiver.

2. Description of the Related Art

In general, conventional selectively called radio receivers have rescue means used when control units are erroneously operated due to some reason, and thereafter the control units cannot be recovered to the normal operations. However, operations in such a case that the normal operation is again commenced after this erroneous (error) operation are not guaranteed.

When the conventional selectively called radio receiver is recovered from the error operation condition to the normal operation condition, the control unit thereof cannot recognize that this control unit was erroneously operated in the past. As a consequence, for example, even when the information stored in the memory is electrically destroyed by the error operation, the succeeding process operation can be continued in this control unit. As a result, there is a risk that the secondary error operation is conducted due to the execution of this succeeding process operation.

Also, the access operation to such a memory region other than the memory region to which the control unit is allowed to access may give adverse influences to the lifetime of the cell. In other words, there is such a risk that the access operation to such a memory region other than the memory region to which the control unit is allowed to access is carried out in combination with the data having the floating (intermediate) potential other than either the logic level "1" or the logic level "0". Also, there is another risk that when the write protection region is write-accessed, the potential of the logic level "1" may collide with the potential of the logic level "0" on the same signal line. In this potential collision case, the impedance between the power supply and the ground becomes low, so that the penetration current may flow. As a result, the power consumption is increased to thereby shorten the lifetime of the cell.

As one conventional technical solution, for instance, the Japanese Laid-open Patent Disclosure JP-A-Heisei 2-141837 opened in 1990 discloses "Microprocessor Controlling System". This microprocessor controlling system is directed to detect the runaway phenomenon of this microprocessor and to perform the abnormal condition rescue process.

To achieve this purpose, this conventional microprocessor control system employs such a memory that the redundant memory regions are additionally provided with the respective memory regions. Into this redundant memory region, the discrimination information is written by which the normally-program-stored memory region can be discriminated from the program-not-stored memory region. Then, when the microprocessor accesses to the memory region, the content of the redundant memory region added to the accessed memory region is referred, the microprocessor can discriminate whether this access operation belongs to normal access operation, or the abnormal access operation. As a result of this discrimination, when the abnormal access operation is carried out, the microprocessor performs the abnormal access rescue process. Accordingly, in such a case that while the microprocessor executes the program, when the memory region other than the memory region into which the program is normally stored is referred, the microprocessor judges that the abnormal condition happens to occur, and therefore performs the abnormal access rescue process.

However, in this conventional microprocessor control system, the redundant memory regions should be additionally provided with all of the address spaces to which the microprocessor will possibly access. As a consequence, there is a problem that the memory having the large capacity is required.

SUMMARY OF THE INVENTION

The present invention has been made to solve the above-described problems, and therefore, has an object to provide a selectively called radio receiver and a controlling method thereof, capable of suppressing power consumption even when a control unit is erroneously operated, while improving reliability thereof.

To achieve the above-described object, a selectively called radio receiver, according to a first aspect of the present invention, comprising:

- a receiving unit for receiving a radio selection signal to produce reception information;
- an operation unit for accepting an operation to produce operation information;
- a storage unit to which a predetermined address space is allocated;
- a processing unit for processing at least one of the reception information outputted from the receiving unit and the operation information outputted from the operation unit by accessing to the storage unit;
- a notifying unit for notifying a processing result obtained by the processing unit; and
- a monitoring unit for monitoring an access condition of the processing unit to the storage unit to thereby control the processing unit based on a monitoring result obtained by the monitoring unit.

The above-described monitoring unit employed in the selectively called radio receiver, according to the first aspect of the present invention, may be arranged by that the monitoring unit includes an address analyzing unit for analyzing an address used to access to the storage unit, and detects that the processing unit is erroneously operated in such a case that an address analysis result obtained by the address analyzing unit indicates such a fact that a storage region of the storage unit which is never accessed during normal operation of the selectively called radio receiver is accessed by the processing unit.

Also, the above-described monitoring unit employed in the selectively called radio receiver, according to the first aspect of the present invention, may be arranged by that the monitoring unit includes an address analyzing unit for analyzing an address used to access to the storage unit, and detects that the processing unit is erroneously operated in such a case that an address analysis result obtained by the address analyzing unit indicates such a fact that an address space which is never present in the storage unit is accessed by the processing unit.

Furthermore, the above-described monitoring unit employed in the selectively called radio receiver, according to the first aspect of the present invention, may be arranged by that the monitoring unit includes an address analyzing unit for analyzing an address used to access to the storage unit, and detects that the processing unit is erroneously operated in such a case that an address analysis result obtained by the address analyzing unit indicates such a fact that a write protection region of the storage unit is write accessed by the processing unit.

These monitoring units may be arranged as follow. That is, each of the monitoring units instruct to reinitialize the processing unit when the monitoring unit detects such a fact that the processing unit is erroneously operated.

Also, the monitoring unit may be further comprised of a counting unit for counting an occurrence time of the error operation occurred in the processing unit, and instructs to reinitialize the processing unit when a counting result obtained by the counting unit exceeds a predetermined value. In this case, the selectively called radio receiver may be arranged by further comprising a count processing unit for setting the operation of the counting unit to be enable, or disable.

Also, to achieve the above-explained object, a method for controlling a selectively called radio receiver, according to a second aspect of the present invention, comprising the steps of:

providing a storage unit to which a predetermined address space is allocated;

receiving a radio selection signal to form reception information;

accepting an operation to form operation information;

accessing to the storage unit so as to process at least one of the reception information and the operation information;

notifying a processing result obtained at the accessing/processing step; and monitoring an access condition to the storage unit to thereby control the accessing/processing step based on a monitoring result obtained at the monitoring step.

BRIEF DESCRIPTION IF THE DRAWINGS

For a better understanding of the present invention, reference is made of a detailed description to be read in conjunction with the accompanying drawings, in which.

DESCRIPTION OF THE PREFERRED EMBODIMENTS

Referring now to drawings, a selectively called radio receiver (wireless pager) and a controlling method thereof, according to a preferred embodiment of the present invention, will be described in detail.

Figure 1:
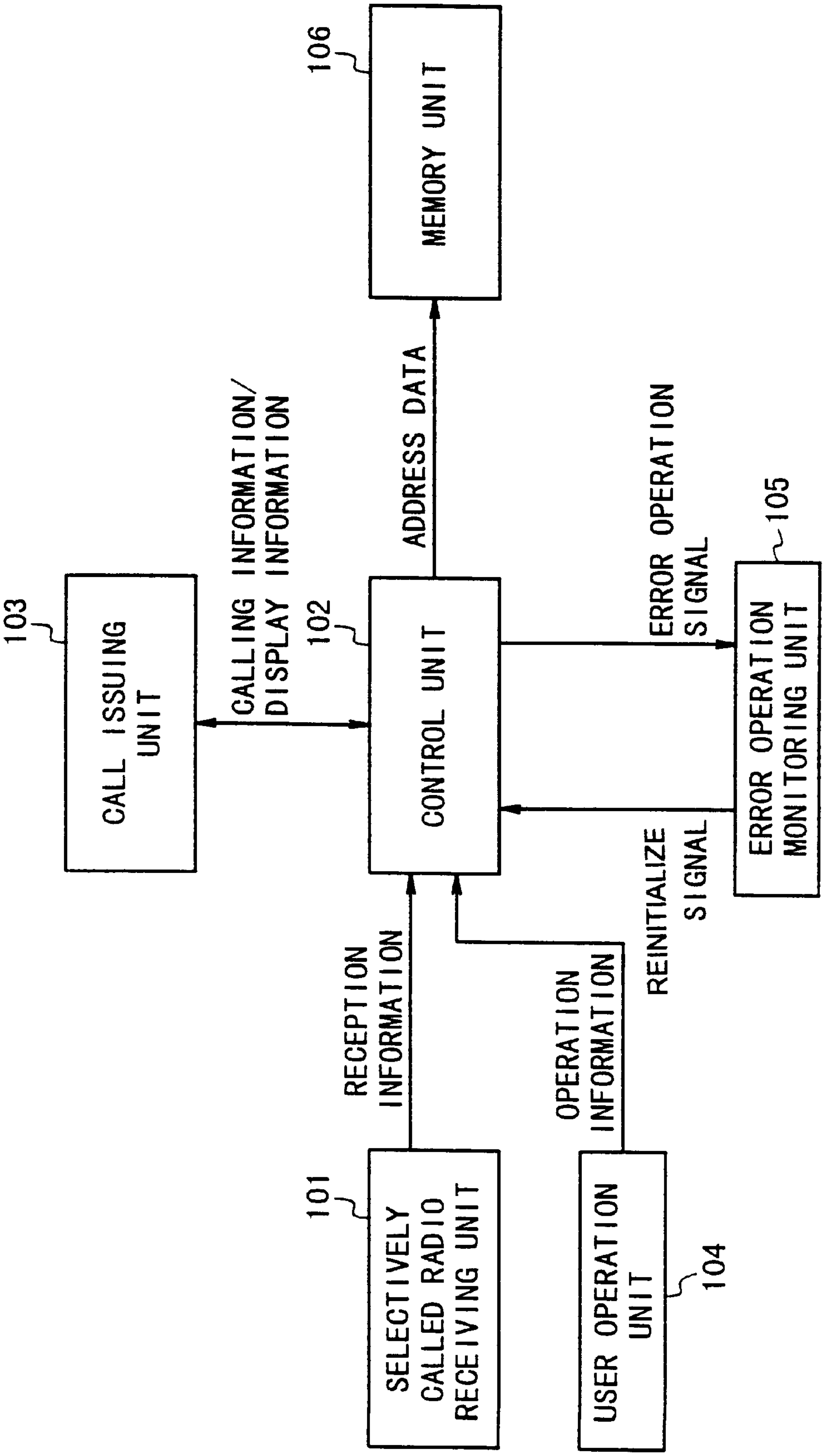
FIG. 1 is a schematic block diagram for representing an arrangement of a selectively called radio receiver according to an embodiment of the present invention.

First, a description will now be made of an overall arrangement of the selectively called radio receiver according to this embodiment with reference to a schematic block diagram of FIG. 1. As indicated in FIG. 1, this selectively called radio receiver is arranged by a selectively called radio receiving unit 101, a control unit 102, a call issuing unit 103, a user operation unit 104, an error operation monitoring unit 105, and a memory unit 106.

The selectively called radio receiving unit 101 corresponds to a receiving unit of the present invention, and may receive a radio (wireless) signal to output reception information. This selectively called radio receiving unit 101 is constituted by, for instance, an antenna, a radio signal unit, and a demodulating unit. The reception information contains address information and message information. The reception information derived from this selectively called radio receiving unit 101 is supplied to the control unit 102.

The user operation unit 104 corresponds to an operation unit of the present invention, and may accept user operations to output operation information. This user operation unit 104 is equipped with a switch unit (not shown in detail) used to control this selectively called radio receiving unit 101. The operation information derived from this user operation unit 104 is supplied to the control unit 102.

The processing unit of the present invention is constructed of a portion (namely, address analyzing unit 202 as will be explained later) of the control unit 102, and the error operation monitoring unit 105.

The control unit 102 analyzes the reception information outputted from the selectively called radio receiving unit 101 and the operation information outputted from the user operation unit 104, and executes process operations in response to the analysis result. The process result is supplied as calling information and display information to the call issuing unit 103. A detailed control operation of this control unit 102 will be explained later.

The call issuing unit 103 corresponds to a notifying unit of the present invention, and is arranged by a display device (not shown) and a speaker (not shown either). This call issuing unit 103 produces a calling sound in response to the calling information issued from the control unit 102. Based upon the display information supplied from the control unit 102, both a message contained in the reception information outputted from the selectively called radio receiving unit 101, and another message produced based on the operation information supplied from the user operation unit 104 are displayed.

The error operation monitoring unit 105 monitors operations of the control unit 102. Then, when such an operation happens to occur, which is not originally executed by this control unit 102, the error operation monitoring unit 105 may judge that the error operation is performed by the control unit 102, and thus instructs a reinitialization. A detailed operation of this error operation monitoring unit 105 will be explained later.

The memory unit 106 corresponds to a storage unit of the present invention, and may store therein a control program, a calculation result and so on. A detailed operation of this memory unit 106 will be explained later.

Figure 2:
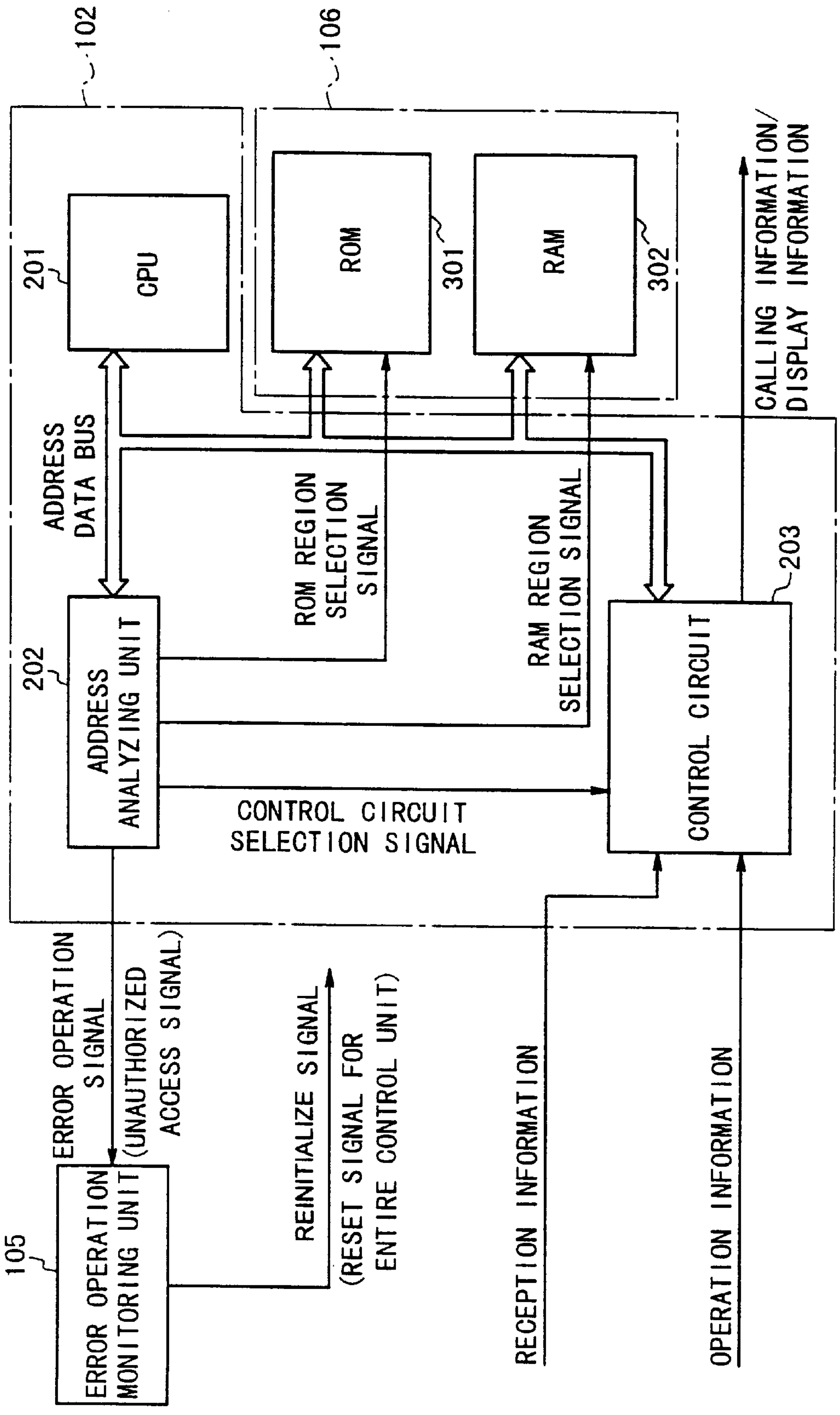
FIG. 2 is a schematic block diagram for indicating a detailed structure of a major unit of the selectively called radio receiver according to the embodiment of the present invention.

FIG. 2 is a schematic block diagram for representing a detailed circuit arrangement of the above-described control unit 102, error operation monitoring unit 105, and memory unit 106 employed in the selectively called radio receiver shown in FIG. 1. The control unit 102 is constructed of a central processing unit (CPU) 201, an address analyzing unit 202, and a control circuit 203. Also, the memory unit 106 is constituted of a ROM 301 and a RAM 302. Furthermore, the error operation monitoring unit 105 is arranged by a counter 204, will be discussed later.

The above-explained CPU 201, address analyzing unit 202, control circuit 203, ROM 301, and RAM 302 are mutually connected to each other via an address data bus. A ROM region selection signal is supplied from the address analyzing unit 202 to the ROM 301, a RAM region selection signal is supplied therefrom to the RAM 302, and a control circuit selection signal is supplied therefrom to the control circuit 203.

Figure 3:
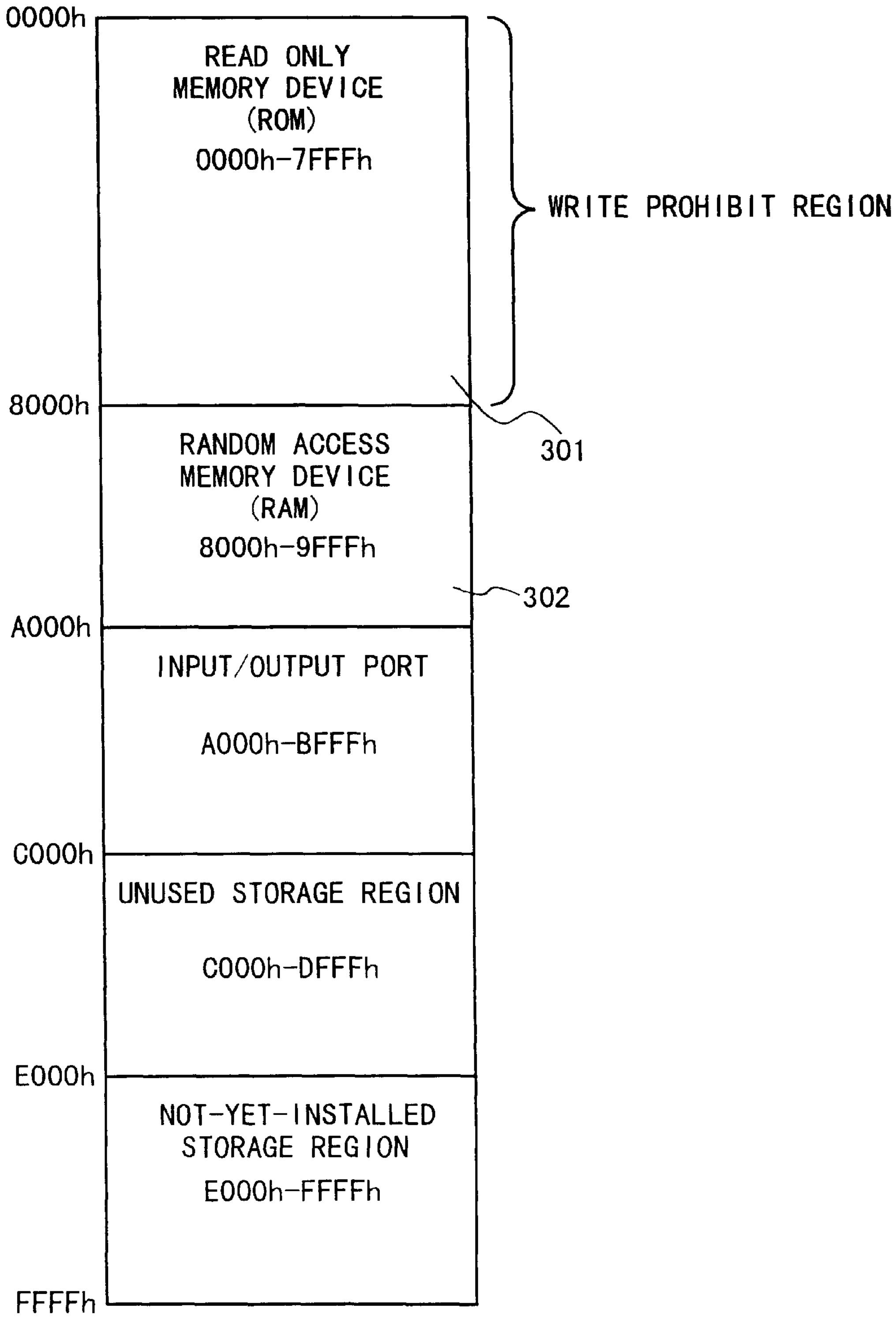
FIG. 3 illustrates an address map of a memory unit employed in the selectively called radio receiver shown in FIG. 2.

An address space of the memory unit 106 is defined as, for instance, shown in FIG. 3. That is, among addresses "0000h" to "FFFFh" accessible by the CPU 201, memory regions constructed by a ROM are allocated to the addresses "0000h" to "7FFFh". It should be noted that the last digit "h" of the respective addresses indicates that a preceding numeral value is equal to a hexadecimal. For example, a control program and fixed data are preciously stored in this ROM 301. The memory region arranged in this ROM 301 is set under write protection.

Also, memory regions constituted in the RAM 302 are allocated to addresses "8000h" to "9FFFh". For instance, various sorts of calculation results produced when the control program is run are temporarily stored in this RAM 302. Furthermore, for example, an input/output port (not shown) provided with the control circuit, namely a counter section for transmitting/receiving data to/from the CPU 201 is allocated to addresses "A000h" to "BFFFh".

Also, memory regions constructed in the ROM, or the RAM are allocated to addresses "C000h" to "DFFFh". However, these memory regions are not used in this selectively called radio receiver. In addition, nothing is allocated to addresses "E000h" to "FFFFh". During the normal process operation, the CPU 201 does not use the above-explained addresses "C000h" to "FFFFh".

In other words, such a fact that these addresses "C000h" to "FFFFh" happen to occur implies that the control unit 102 is operated under error condition.

The address analyzing unit 202 acquires the address information transferred via the address data bus to make any one of the ROM region selection signal, the RAM region selection signal, the control circuit selection signal, and the error operation signal active in response to an address value of the acquired address information. In a concrete example, when the address values transferred via the address bus are "0000h" to "7FFFh", the address analyzing unit 202 makes the ROM region selection signal active. Also, when the address values transferred via the address data bus are equal to "8000h" to "9FFFh", this address analyzing unit 202 makes the RAM region selection signal active. Further, when the address values transferred via the address bus are "A000h" to "BFFFh", the address analyzing unit 202 makes the control circuit selection signal active. Also, when the address values transferred via the address data bus are equal to "C000h" to "FFFFh", this address analyzing unit 202 makes the error operation signal active. The ROM region selection signal produced from this address analyzing unit 202 is supplied to the ROM 301, the RAM region selection signal produced therefrom is supplied to the RAM 302, the control circuit selection signal produced therefrom is furnished to the control circuit 203, and the error operation signal produced therefrom is similarly supplied to the error operation monitoring unit 105.

In other words, this address analyzing unit 202 monitors the access operation and the write access operation to the ROM region designated by the address 0000h to 7FFFh, and will recognize that the error operation happens to occur when these access operations are carried out, so that the error operation signal is brought into the active state. In the first-mentioned access operation, such an unused storage region and also a not-yet-installed storage region are accessed, which are designated by the addresses C000h to FFFFh, and also are not accessed by the CPU 201 if the selectively called radio receiver is operated under normal condition. This address analyzing unit 202 may be arranged by employing, for instance, a decoder, and a comparator.

In the case that the control circuit 203 is addressed by the CPU 201, either the reception information supplied from the selectively called radio receiving unit 101 or the operation information supplied from the user operation unit 104 is sent via the address data bus to the CPU 201. Also, this control circuit 203 transfers the calling information and the display information sent via the address data bus from the CPU 201 to the call issuing unit 103.

Figure 4:
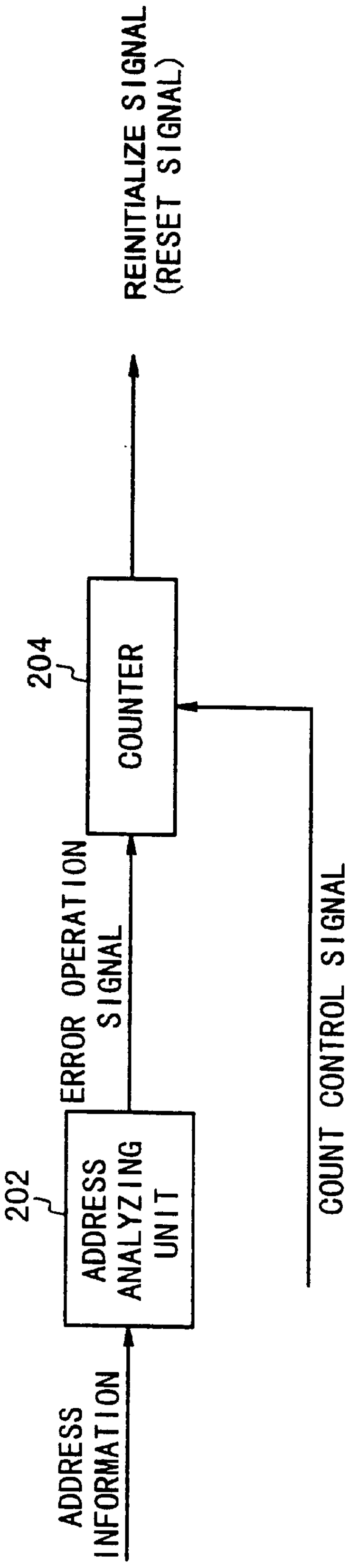
FIG. 4 is a schematic block diagram for indicating an arrangement of an error operation monitoring unit shown in FIG. 2.

As indicated in FIG. 4, the above-explained error operation monitoring unit 105 is arranged by employing, for instance, a counter 204. The address analyzing unit 202 supplies a pulsatory error operation signal to this counter 204. In response to this error operation signal, the counter 204 is counted up, and makes the reinitialize signal active when the count value thereof becomes a preselected value "A". This preselected value "A" may be selected from any values. The reinitialize signal outputted from this counter 204 is supplied as a reset signal to a reset circuit (not shown) employed in the control unit 102. Accordingly, the entire system of this selectively called radio receiver may be reset by receiving this reset signal.

Also, this counter 204 may be so arranged that a count control signal derived from the control unit 102 is supplied thereto. This count control signal is used to control the counter 204 in such a way that the count-up operation is allowed, or prohibited. It should be noted that although a signal producing circuit for producing this count control signal is omitted in the circuit arrangements of FIG. 1 and FIG. 2, this signal producing circuit may be arranged by using an input/output port and a flip-flop. In this case, this flip-flop is set, or cleared in response to the operation information supplied from the user operation unit 104. An output signal from the flip-flop is supplied as a count control signal to the counter 204. With employment of this circuit arrangement, any user can freely control whether or not the error operation monitoring unit 105 is operable through the user operation unit 104.

Figure 5:
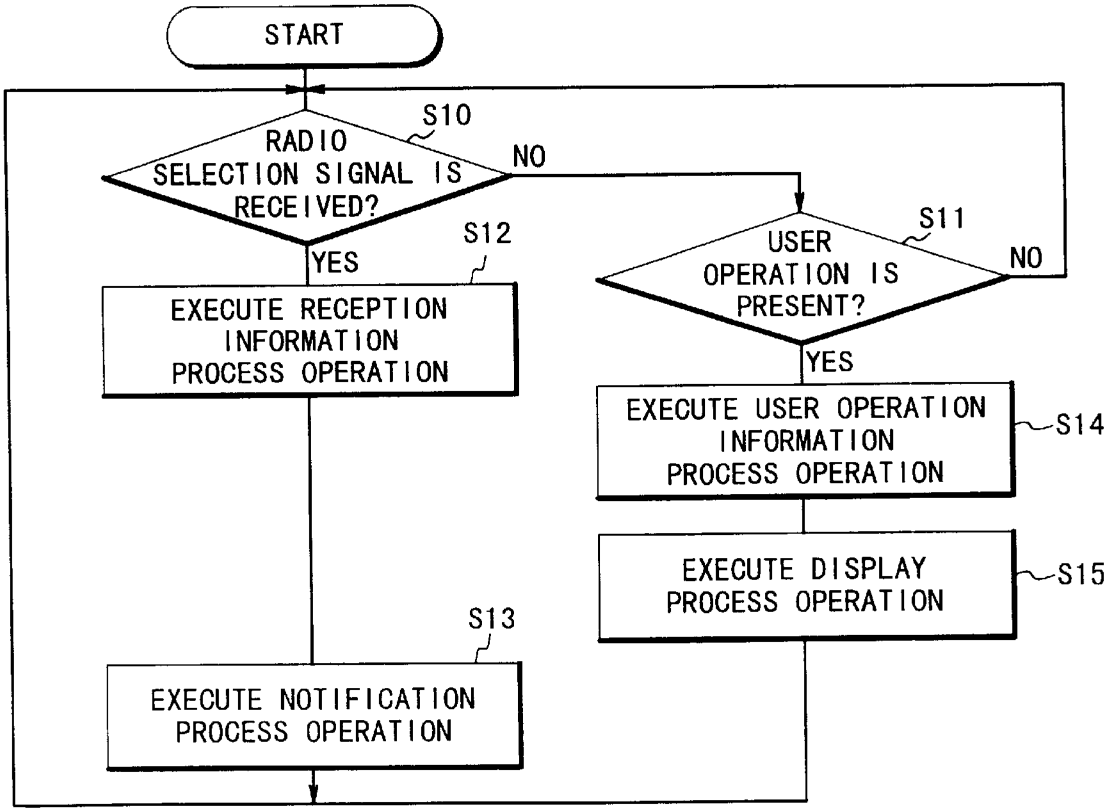
FIG. 5 is a flow chart for describing operations of the selectively called radio receiver according to the embodiment of the present invention.

Referring now to a flow chart shown in FIG. 5, overall operations of the selectively called radio receiver with the above-described arrangement, according to the preferred embodiment of the present invention, will be described.

When the power supply of this selectively called radio receiver is turned ON, a check is first made as to whether or not the radio selection signal is received (step S10). If it is so judged that the radio signal is not received, then another check is done as to whether or not any operation is performed by the user (step S11). That is, a check is made as to whether or not the switch unit of the user operation unit 104 is manipulated. Then, when it is so judged that no user operation is made, the process operation is returned to the previous step S10 at which a similar process operation is repeatedly carried out. Since the process operations defined at the step S10 and the step S11 are repeatedly carried out, a waiting condition may be formed.

When it is so judged at the step S10 that the radio selection signal is received under this waiting condition, the reception information process operation is carried out (step S12). In this reception information process operation, the reception information supplied from the selectively called receiving unit 101 is analyzed. As a result, such a confirmation is made that the reception information corresponds to information directed to this selectively called radio receiver, a message is fetched, and calling sound data is produced.

Next, a notification process operation is carried out (step S13). In this notification process operation, both the message and the calling sound data derived at the previous step S12 are sent as the display information and the calling information to the call issuing unit 103. As a result, upon receipt of the radio selection signal, the calling sound is produced and the received message is displayed on the display device. Thereafter, the process operation is returned to the step S10 at which the selectively called radio receiver is brought into the waiting condition.

On the other hand, when it is so judged that the user operation is carried out at the previous step S11 under the above-described waiting condition, a user operation information process operation is performed (step S14). In this user operation information process operation, such a process operation is carried out in response to, for example, the key manipulation of the user operation unit 104, so that the data displayed on the display device of the call notifying unit 103 is produced. Next, a display process operation is carried out (step S15). In other words, the data produced at the step S14 is sent as the display information to the call notifying unit 103. Accordingly, the displayed content of the display device is changed in response to the switch manipulation of the user operation unit 104. Thereafter, the process operation is returned to the step S10 at which this selectively called radio receiver is brought into the waiting condition.

Figure 6:
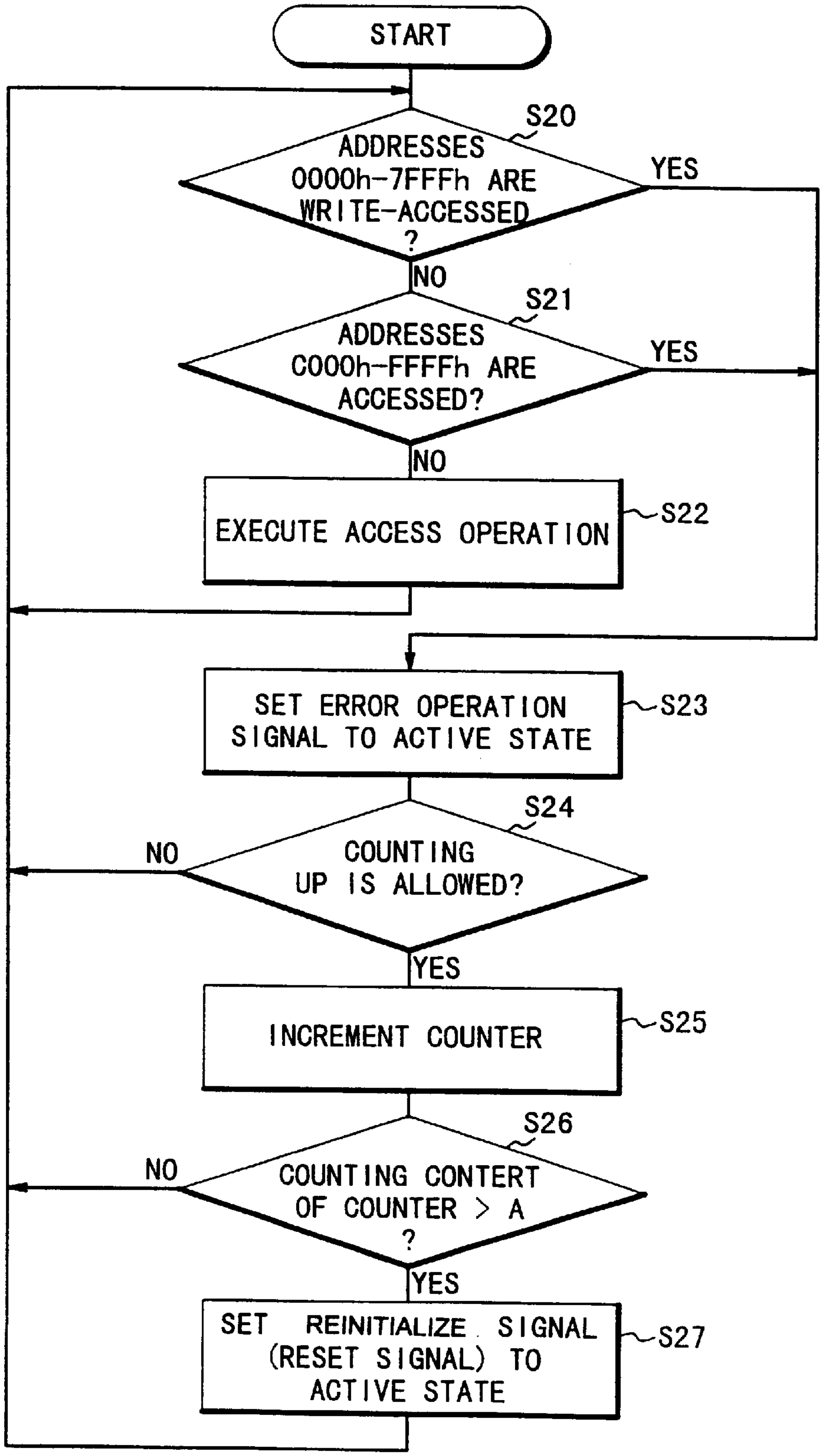
FIG. 6 is a flow chart for explaining operations of the error operation monitoring unit indicated in FIG. 4.

Referring now to a flow chart indicated in FIG. 6, a description will be made of operations of the error operation monitoring unit 105 according to the present invention. When the operation of this selectively called radio receiver is commenced, the address analyzing unit 202 investigates as to whether or not the addresses of "0000h" to "7FFFh" are outputted to the address data bus and the write access is performed (step S20). If the address analyzing unit 202 judges "YES", then this address analyzing unit 202 recognizes that the write access is executed to the write protection region. Thus, in order to execute an error operation processing operation, the monitoring process operation is branched to a step S23.

Conversely, when it is so judged "NO" at the above-described step S20, the address analyzing unit 202 checks as to whether or not the addresses of "C000h" to "FFFFh" are outputted to the address data bus and the read access, or the write access is executed (step S21). When it is so judged "YES" at this step, the address analyzing unit 202 recognizes that either the read access or the write access is carried out for the unused storage region (addresses of "C000h" to "DFFFh"), or the not-yet-installed storage region (addresses of "E000h" to "FFFFh") of the memory unit 106.

Then, the monitoring process operation is branched at the step S23 so as to execute the error operation processing operation.

Conversely, when the address analyzing unit 202 judges "NO" at the step S21, the access operation is carried out in accordance with the addresses flowing through the address data bus at this stage (step S22).

In other words, the read access is executed to such a memory region designated by the addresses of "0000h" to "7FFFh", and also both the read access and the write access are carried out to another memory region designated by the addresses of "8000h" to "BFFFh". Thereafter, the monitoring process operation is returned to the previous step S20.

At the step S23, the error operation signal is made active. Subsequently, another check is made as to whether or not the counting up is allowed with reference to the count control signal supplied from the control unit 102 (step S24). At this step S24, when it is judged that the counting up is not allowed, the monitoring process operation is returned to the step S20 at which a similar process operation is repeatedly performed. To the contrary, when it is judged that the counting up is allowed, the counter 204 is incremented (step S25).

Subsequently, another check is made as to whether or not the incremented counting content of the counter 204 is greater than a predetermined value A (step S26). At this step, when it is so judged that this counting content is not larger than the predetermined value A, the monitoring process operation is returned to the step S20 at which a similar process operation is repeatedly performed. Conversely, when it is so judged that the counting content becomes larger than the predetermined value A, the reinitialize signal (reset signal) is made active.

Thereafter, the monitoring process operation is returned to the step S20. As a consequence, the entire system of this selectively called radio receiver is reset to the initial condition.

In accordance with the selectively called radio receiver with the above-described arrangement of this referred embodiment of the present invention, when such an access operation happens to occur, which never occurs if the control unit 102 is operated under normal operation, the error operation signal is made active. That is to say, when the write access to the memory region designated by the addresses of "0000h" to "7FFFh" happens to occur and also the read/write access to the memory region designated by the addresses of "C000h" to "FFFFh" happens to occur, the error operation signal is brought into the active state. Then, the times when this error operation signal is made active are counted by the counter 204. In the case that the counting content of this counter 204 exceeds a predetermined value "A", this selectively called radio receiver is reinitialize. As a consequence, since the secondary error operation caused by the error operation of the control unit 102 can be prevented, it is possible to avoid an increase of power consumption occurred when the control unit 102 is erroneously operated.

As previously explained, according to the selectively called radio receiver of the present invention, since the error operation of the control unit is sensed to prevent the occurrence of the secondary error operation, there is such an advantage.

That is, it is possible to prevent increasing of the power consumption caused when the control unit is erroneously operation. Also, since the error operation of the control unit can be automatically sensed, the reliability of this selectively called radio receiver can be improved.

What is claimed is:

1. A selectively called radio receiver comprising:

a receiving unit for receiving a radio selection signal to produce reception information;

an operation unit for accepting an operation to produce operation information;

a storage unit comprising address space allocated for normal read/write operations;

a processing unit for processing at least one of said reception information outputted from said receiving unit and said operation information outputted from said operation unit by accessing said storage unit;

a notifying unit for notifying a processing result obtained by said processing unit; and a monitoring unit for detecting an error if said processing unit accesses an address in said storage unit other than in said addresses allocated for normal read/write operations and outputs a reinitialization signal to reset said processing unit.

2. A selectively called radio receiver comprising:

a receiving unit for receiving a radio selection signal to produce reception information;

an operation unit for accepting an operation to produce operation information;

a storage unit comprising address space allocated for normal read/write operations;

a processing unit for processing at least one of said reception information outputted from said receiving unit and said operation information outputted from said operation unit by accessing said storage unit;

a notifying unit for notifying a processing result obtained by said processing unit; and a monitoring unit for detecting an error if said processing unit accesses an address in said storage unit other than in said addresses allocated for normal read/write operations and outputs a reinitialization signal to reset said processing unit, wherein said monitoring unit further comprises a counting unit for counting a number of times an error operation occurred in said processing unit, and reinitializes said processing unit when a counting result obtained by said counting unit exceeds a predetermined value.

3. A selectively called radio receiver according to claim 2, further comprising:

a count processing unit for setting the operation of said counting unit to be one of enabled and disabled.

4. A selectively called radio receiver according to claim 1, wherein said monitoring unit includes an address analyzing unit for analyzing the address used to access to said storage unit, and detects that said processing unit is erroneously operated when an address analysis result obtained by said address analyzing unit indicates that an address space which is never present in said storage unit is accessed by said processing unit.

5. A selectively called radio receiver according to claim 4, wherein said monitoring unit reinitializes said processing unit when said monitoring unit detects that said processing unit is erroneously operated.

6. A selectively called radio receiver comprising:

a receiving unit for receiving a radio selection signal to produce reception information;

an operation unit for accepting an operation to produce operation information;

a storage unit comprising address space allocated for normal read/write operations;

a processing unit for processing at least one of said reception information outputted from said receiving unit and said operation information outputted from said operation unit by accessing said storage unit;

a notifying unit for notifying a processing result obtained by said processing unit; and a monitoring unit for detecting an error if said processing unit accesses an address in said storage unit other than in said addresses allocated for normal read/write operations and outputs a reinitialization signal to reset said processing unit, wherein said monitoring unit comprises:

an address analyzing unit for analyzing the address used to access to said storage unit, and detects that said processing unit is erroneously operated when an address analysis result obtained by said address analyzing unit indicates that an address space which is never present in said storage unit is accessed by said processing unit, and a counting unit for counting a number of times an error occurred in said processing unit, and reinitializes said processing unit when a counting result obtained by said counting unit exceeds a predetermined value.

7. A selectively called radio receiver according to claim 1, wherein said monitoring unit includes an address analyzing unit for analyzing an address used to access to said storage unit, and detects an error when an address analysis result obtained by said address analyzing unit indicates that a write protection region of said storage unit is write-accessed by said processing unit.

8. A selectively called radio receiver according to claim 7, wherein said monitoring unit reinitializes said processing unit when said monitoring unit detects an error.

9. A selectively called radio receiver comprising:

a receiving unit for receiving a radio selection signal to produce reception information;

an operation unit for accepting an operation to produce operation information;

a storage unit comprising address space allocated for normal read/write operations;

a processing unit for processing at least one of said reception information outputted from said receiving unit and said operation information outputted from said operation unit by accessing said storage unit;

a notifying unit for notifying a processing result obtained by said processing unit; and a monitoring unit for detecting an error if said processing unit accesses an address in said storage unit other than in said addresses allocated for normal read/write operations and outputs a reinitialization signal to reset said processing unit, wherein said monitoring unit comprises:

an address analyzing unit for analyzing an address used to access to said storage unit and detects an error when an address analysis result obtained by said address analyzing unit indicates that a write protection region of said storage unit is write-accessed by said processing unit, and a counting unit for counting a number of times an error occurred in said processing unit, and reinitializes said processing unit when a counting result obtained by said counting unit exceeds a predetermined value.

10. A method for controlling a selectively called radio receiver, comprising the steps of:

providing a storage unit comprising address space allocated for normal operations;

receiving a radio selection signal to form reception information;

forming operation information in response to an operation of an operation unit;

accessing to said storage unit by a processing unit such that at least one of said reception information and said operation information is processed;

notifying a processing result obtained at said accessing step;

monitoring an access condition to detect an error if said processing unit accesses an address in said storage unit other than in said addresses allocated for normal operation; and reinitializing said processing unit when an error is detected.

11. A method for controlling a selectively called radio receiver, comprising the steps of:

providing a storage unit comprising address space allocated for normal operations;

receiving a radio selection signal to form reception information;

forming operation information in response to an operation of an operation unit;

accessing to said storage unit by a processing unit such that at least one of said reception information and said operation information is processed;

notifying a processing result obtained at said accessing step;

monitoring an access condition to detect an error if said processing unit accesses an address in said storage unit other than in said addresses allocated for normal operation; and reinitializing said processing unit when an error is detected, wherein said monitoring step includes counting a number of times an error is detected; and reinitializing said processing unit when a counting result exceeds a predetermined value.

12. A method for controlling a selectively called radio receiver according to claim 11, further comprising the step of:

enabling or disabling said counting step based on a control signal.

13. A method for controlling a selectively called radio receiver according to claim 10, wherein said monitoring step includes analyzing an address used to access to said storage unit to obtain an address analysis result; and detecting an occurrence of an error when said address analysis result indicates that an address space not existing in said storage unit is accessed.

14. A method for controlling a selectively called radio receiver, comprising the steps of:

providing a storage unit comprising address space allocated for normal operations;

receiving a radio selection signal to form reception information;

forming operation information in response to an operation of an operation unit;

accessing to said storage unit by a processing unit such that at least one of said reception information and said operation information is processed;

notifying a processing result obtained at said accessing step;

monitoring an access condition to detect an error if said processing unit accesses an address in said storage unit other than in said addresses allocated for normal operation; and reinitializing said processing control unit when an error is detected, wherein said monitoring step comprises:

analyzing an address used to access to said storage unit to obtain an address analysis result;

detecting an occurrence of an error when said address analysis result indicates that an address space not existing in said storage unit is accessed;

counting a number of times an error is detected; and reinitializing said processing unit when a counting result exceeds a predetermined value.

15. A method for controlling a selectively called radio receiver according to claim 10, further comprising the steps of: analyzing an address used to access to said storage unit to obtain an address analysis result; and detecting an occurrence of an error when said address analysis result indicates that a write protection region of said storage unit is write-accessed.

16. A method for controlling a selectively called radio receiver comprising the steps of:

providing a storage unit comprising address space allocated for normal operations;

receiving a radio selection signal to form reception information;

forming operation information in response to an operation of an operation unit;

accessing to said storage unit by a processing unit such that at least one of said reception information and said operation information is processed;

notifying a processing result obtained at said accessing step;

monitoring an access condition to detect an error if said processing unit accesses an address in said storage unit other than in said addresses allocated for normal operation;

reinitializing said processing unit when an error is detected analyzing an address used to access to said storage unit to obtain an address analysis result;

detecting an occurrence of an error when said address analysis result indicates that a write protection region of said storage unit is write-accessed;

counting a number of times an error occurs; and reinitializing said processing unit when a counting result exceeds a predetermined value.

17. A selective calling receiver capable of automatically resetting itself when an error condition occurs, comprising:

a radio for receiving call information;

a memory divided into a read only portion and a read/write portion;

a controller connected to said radio and to said memory for controlling reading and writing the call information from said radio to said read/write portion of said memory; and an error monitoring means connected to said controller for generating a reset signal to reset said controller if said controller attempts to write the call information to said read only portion of said memory.

18. A selective calling receiver capable of automatically resetting itself when an error condition occurs comprising:

a radio for receiving call information;

a memory divided into a read only portion and a read/write portion;

a controller connected to said radio and to said memory for controlling reading and writing the call information from said radio to said read/write portion of said memory;

an error monitoring means connected to said controller for generating a reset signal to reset said controller if said controller attempts to write the call information to said read only portion of said memory; and a counter for counting errors detected by said error monitoring means and generating said reset signal only after a selected number of errors has been counted.

* * * * *